United States Patent
Jajtic et al.

(10) Patent No.: US 7,893,569 B2
(45) Date of Patent: *Feb. 22, 2011

(54) PRIMARY PART AND LINEAR ELECTRICAL MACHINE WITH FORCE RIPPLE COMPENSATION

(75) Inventors: Zeljko Jajtic, München (DE); Gerhard Matscheko, Starnberg (DE); Christian Volmert, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/388,035

(22) Filed: Feb. 18, 2009

(65) Prior Publication Data

US 2009/0206681 A1    Aug. 20, 2009

(30) Foreign Application Priority Data

Feb. 18, 2008  (EP) .................................. 08002961

(51) Int. Cl.
*H02K 41/00* (2006.01)
(52) U.S. Cl. .................................. 310/12.18
(58) Field of Classification Search .............. 310/12.01, 310/12.18, 12.22, 12.24, 12.25, 181
See application file for complete search history.

(56) References Cited

U.S. PATENT DOCUMENTS

| | | | |
|---|---|---|---|
| 5,910,691 A * | 6/1999 | Wavre | 310/12.18 |
| 6,831,379 B2 * | 12/2004 | Ohto et al. | 310/12.18 |
| 2003/0098620 A1 | 5/2003 | Ohto et al. | |
| 2006/0012252 A1 * | 1/2006 | Miyata et al. | 310/12 |

FOREIGN PATENT DOCUMENTS

| | | |
|---|---|---|
| DE | 10 2004 045 992 A1 | 4/2006 |
| DE | 10 2005 004 380 A1 | 8/2006 |
| JP | 2005/168243 A | 6/2005 |

* cited by examiner

*Primary Examiner*—Nguyen N Hanh
(74) *Attorney, Agent, or Firm*—Henry M. Feiereisen; Ursula B. Day

(57) ABSTRACT

A linear electric motor including a primary part having a flux guiding element on the end faces of the primary part, a three-phase winding on the primary part that produces a first magnetic field and a permanent magnet on each end face that produces a second magnetic field that is superimposed on the first field to reduce force ripple is disclosed. The primary part has tooth modules and also end-tooth modules. The end-tooth modules have no winding, are located on the end face, and are smaller in volume than and shaped differently from the tooth modules. The primary part is separated from a secondary part by an air gap, and the end-tooth modules are separated from the secondary part by an additional air gap.

17 Claims, 2 Drawing Sheets

PRIMARY PART AND LINEAR ELECTRICAL MACHINE WITH FORCE RIPPLE COMPENSATION

CROSS-REFERENCES TO RELATED APPLICATIONS

This application claims the priority of European Patent Application, Serial No. 08002961, filed Feb. 18, 2008, pursuant to 35 U.S.C. 119(a)-(d), the content of which is incorporated herein by reference in its entirety as if fully set forth herein.

BACKGROUND OF THE INVENTION

The present invention relates to a primary part of a linear electrical machine, and to a linear electrical machine with a primary part.

The following discussion of related art is provided to assist the reader in understanding the advantages of the invention, and is not to be construed as an admission that this related art is prior art to this invention.

Linear electrical machines have a primary part and a secondary part. The primary part and the second part are opposite one another and are separated from one another by an air gap. The primary part is designed for electric current to be passed through it.

It is possible for both the primary part and the secondary part to have active means for production of magnetic fields. In a situation such as this, for example, the primary part has a winding through which current can be passed, and the secondary part has permanent magnets.

In addition, it is also possible for the primary part to have a plurality of active means for production of magnetic fields, and for the secondary part to be free of such means.

For example, German Offenlegungsschrift DE 10 2004 045 992 A1 discloses an electrical machine wherein the primary part has all the magnetic sources of the electrical machine. In this example, the primary part has a winding through which current can be passed and permanent magnets. In contrast, the secondary part is only a toothed iron reaction rail.

In contrast to electrical machines which operate by rotation, linear electrical machines have end areas, of course, in which the electromagnetic part of the machine ends. If, for example, a linear motor is designed using a short stator construction, that is to say the primary part is a shorter component than a longer secondary part, this results in the primary part having two end areas which are located in the influence area of the secondary part. The ends of the primary part interact with the secondary part such that it has a significant influence on the active force ripple and the passive force ripple, also referred to as the cogging force.

Parasitic cogging forces that occur as a result of the magnetic interaction between the primary part and the secondary part are referred to as passive force ripple. This results in vibration, rough running and drag errors during machining processes.

Furthermore, the induced voltages, i.e., the electromotive force (EMF), in the initial and end coils at the end faces of the primary part are generally less pronounced than in the central coils, owing to the lack of a magnetic return path. In consequence, the electrical machine does not have a symmetrical induced voltage. This results in an additional current-dependent force ripple that is referred to as active force ripple, in addition to reductions in the force.

In accordance with the present invention, a primary part that has a plurality of active means for producing magnetic fields is provided for use in a linear electrical machine that reduces active and passive force ripple, i.e., cogging force, in the linear electrical machine.

It would be desirable and advantageous to address prior art shortcomings and to attain reduced active and passive force ripple, i.e. cogging force.

SUMMARY OF THE INVENTION

According to one aspect of the present invention, a primary part having at least one end face is provided for use with a secondary part in a linear electrical machine. The secondary part is separated from the primary part by a first air gap. The primary part has first means for producing a first magnetic field, and second means for producing a second magnetic field. The second means for producing a second magnetic field is made of permanent-magnet material. The first means and second means are arranged so as to allow the first and second magnetic fields to be superimposed. A flux-guiding element on an end face of the primary part includes the second means for producing a magnetic field, which is arranged so as to reduce force ripple.

The use of the flux-guiding elements makes it possible to reduce the cogging force, i.e., the active and, in particular, the passive force ripple. At the end of the primary part, the voltages induced in the teeth to which windings are fitted are increased by the flux-guiding elements, ensuring that the EMF of the winding of the primary part is as uniform as possible.

According to another advantageous feature of the present invention, the first means for production of a first magnetic field may be configured in the form of a single-phase or polyphase winding.

According to another advantageous feature of the present invention, the primary part may have a three-phase winding made up of tooth-wound coils that are adapted to be connected to a three-phase power supply.

According to another advantageous feature of the present invention, the second means for producing a second magnetic field may include integral permanent magnets, or multi-part permanent magnets, respectively.

According to another advantageous feature of the present invention, the primary part may be formed of a predefined number of tooth modules. Each tooth module may have at least one permanent magnet and one tooth-wound coil. This permits the primary part to be constructed in modular form, the number of individual tooth modules used, depending on the type of module and the length of the primary part. The desired number of tooth modules can be joined together as appropriate, by means of brackets, for example.

According to another advantageous feature of the present invention, each tooth module may have a laminated core made up of electrical laminates arranged to reduce eddy currents in the primary part.

According to another advantageous feature of the present invention, the flux-guiding element may be an end-tooth module on each end face of the primary part that is arranged to reduce force ripple, and has at least one permanent magnet. This end-tooth module corresponds essentially to the tooth modules of the primary part, differing from them in that no windings are fitted to it, i.e., the end-tooth module has no tooth-wound coil.

The use of two additional tooth modules at the ends of the primary part that are arranged as a continuation of the active primary part area, the end-tooth modules, reduces the cogging force, i.e., the active and, in particular, the passive force ripple.

According to another advantageous feature of the present invention, a flux-guiding element may be adapted to be separated from the secondary part by a second air gap, in addition to the first air gap. Thus there is a larger air gap, a greater distance, between the secondary part and a flux-guiding element than between the primary part and the secondary part.

Since there is a larger air gap, i.e., greater distance, between the secondary part and the flux-guiding element than there is between the rest of the primary part and that secondary part, the permanent magnet of the end-tooth module can be designed differently.

According to another advantageous feature of the present invention, the end-tooth module may have a smaller volume than the tooth modules.

According to another advantageous feature of the present invention, the tooth modules of the primary part may have a first tooth pitch with respect to one another, and an end-tooth module may be separated from a tooth module by a predefined second tooth pitch that is not the same as the first tooth pitch, to reduce force ripple.

According to another advantageous feature of the present invention, the second tooth pitch may be greater than the first tooth pitch. As a result, the primary part has two different tooth pitches, and the end-tooth module is at a distance from its adjacent tooth module that is different from the distance between the tooth modules.

According to another advantageous feature of the present invention, a geometry of an end-tooth module may be provided that is different from the geometry of a tooth module, so as to reduce cogging forces.

According to another advantageous feature of the present invention, surfaces and/or corners of the end-tooth module which face the air gap may be rounded with a predefined radius, respectively, so as to reduce cogging forces.

In accordance with the present invention, the following alternatives may be used to effectively reduce force ripple, in order to effectively reduce the cogging force in particular. Each alternative can be implemented individually, or in any desired combination of the various alternatives for that purpose:

1) The flux-guiding element has an additional air gap $\delta_2$ in addition to the normal air gap $\delta_1$ between the primary part and the secondary part, so that the air gap $\delta_2$ is advantageously given as: $0 \leq \delta_2 \leq 5\, \delta_1$.
2) The flux-guiding element has a different tooth pitch $\tau_2$ than the tooth pitch $\tau_1$ of the primary part, so that the different tooth pitch $\tau_2$ is advantageously given as: $0.6\tau_1 \leq \tau_2 \leq 2\tau_1$.
3) The flux-guiding element has a modified geometric shape.

Use of an optimum combination of these particular parameters makes it possible to greatly reduce cogging forces, by as much as a factor of about 2-3.

According to another advantageous feature of the present invention, a polyphase linear motor may be provided having permanent-magnet excitation in the primary part and a passive secondary part, e.g., a toothed iron structure. In all linear motors and linear electrical machines, electromagnetic discontinuities result in a cogging force that interferes with motor operation at both ends of the primary part.

According to another aspect of the present invention, a linear electrical machine has a primary part according to the embodiments of the invention that are described above, and a secondary part that is free of means for producing magnetic fields. The secondary part is advantageously a toothed iron reaction part having a plurality of teeth and slots. Advantageously, that secondary part may be laminated, i.e., formed of a multiplicity of individual electrical laminates, to avoid eddy-current losses. Alternatively, however, the secondary part may be a solid, toothed iron reaction rail.

According to another advantageous feature of the present invention, the linear electrical machine may be a synchronous linear motor.

An electrical machine designed such as this has the advantage that the secondary part of the electrical machine has no active means for production of a magnetic field. The secondary part has only means for guidance of magnetic fields, and is therefore simple and costs little to manufacture.

In accordance with the invention, the use of flux-guiding elements to reduce the cogging force results in a number of advantages:

1) better characteristics during the operation of the electrical machine, a linear motor in particular, such as a) better synchronism, b) a greater rated force, c) higher drive dynamics, and d) no "ghost movement" of the switched-off motor caused by cogging force; and
2) better characteristics in a drive system, such as more accurate pole position identification as a result of reduced electromagnetic asymmetries of the linear motor, end effects in the Siemens Sinamics drive system for example.

Thus, in accordance with the invention, a linear electrical machine is provided that has reduced active and passive force ripple, i.e., cogging force.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
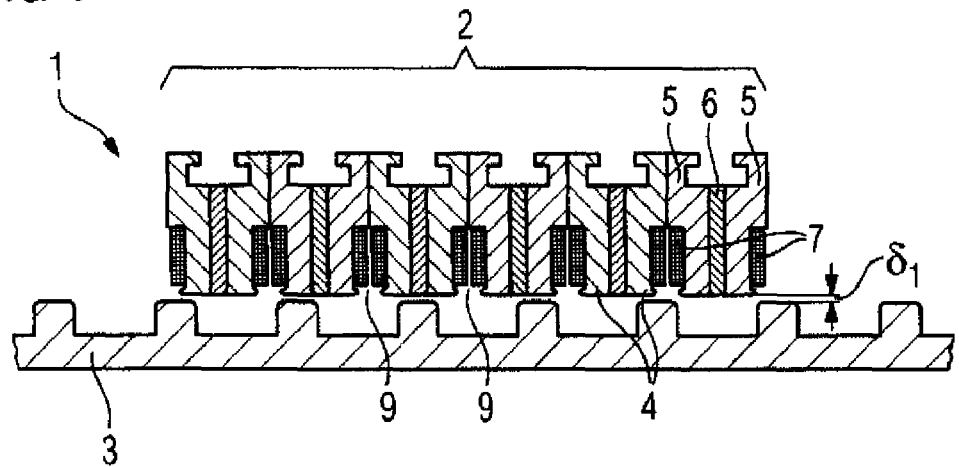
FIG. 1 is a schematic diagram of a linear electrical machine according to the prior art.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a linear electrical machine according to the prior art, without any flux-guiding elements for reducing the force ripple. The linear electrical machine 1 comprises a primary part 2 and a secondary part 3. The primary part 2 is constructed by means of tooth modules 4. As shown in FIG. 1, the primary part is formed from six tooth modules 4, wherein each tooth module 4 is formed by a laminated iron core 5.

The primary part 2 and the secondary part 3 are separated from one another by a first air gap $\delta_1$.

Each tooth module 4 has a permanent magnet 6 which is integrated in the tooth module 4. However, the permanent magnet 6 could also be arranged outside the tooth module 4, on the tooth module 4, or on the side of the primary part 2 facing the air gap $\delta_1$, for example.

Furthermore, each tooth module 4 has a tooth-wound coil 7, wherein the six tooth-wound coils 7 form the winding of the primary part 2. The winding has three phases, with the phases u, v, w, in such a way that two tooth-wound coils 7 are formed for each phase u, v, w. The tooth-wound coils 7 are located in the slots 9 in the primary part 2.

Figure 2:
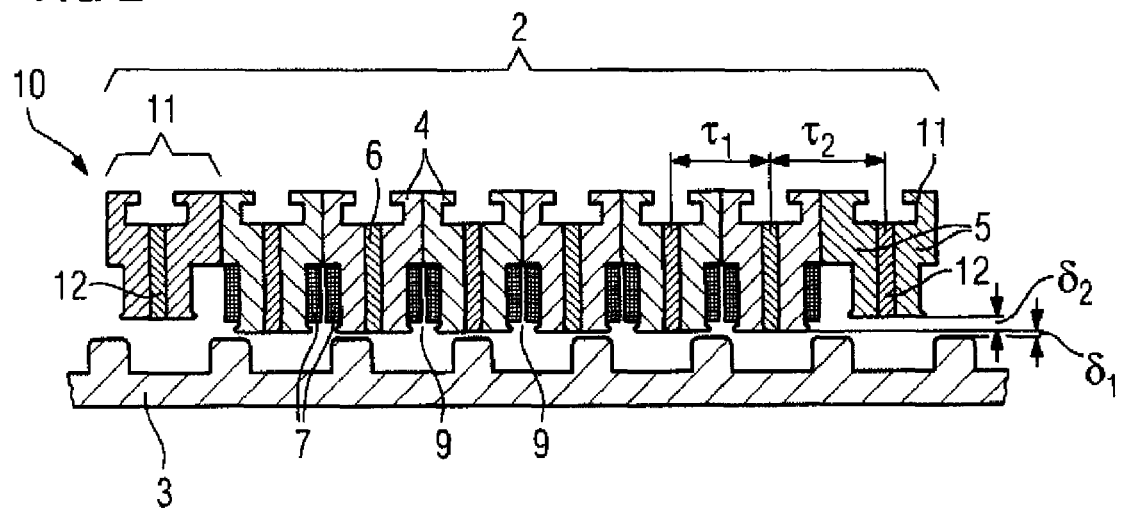
FIG. 2 is a schematic diagram of a first embodiment of a linear electrical machine according to the invention.

Referring now to FIG. 2, there is shown a schematic diagram of a first embodiment of a linear electrical machine according to the invention, generally designated by reference numeral 10. Parts corresponding with those in FIG. 1 are denoted by identical reference numerals and not explained again. As shown in FIG. 2, in addition to the six tooth modules 4, the primary part 2 has additional two end-tooth modules 11, wherein one end-tooth module 11 is arranged on each end face of the primary part 2.

Each end-tooth module 11 is separated from the secondary part 3 by a second air gap $\delta_2$ in addition to the first air gap $\delta_1$, thus resulting in a larger air gap $\delta_1+\delta_2$ between the secondary part 3 and the end-tooth module 11 than between the rest of the primary part 2 and the secondary part 3.

Because of the larger air gap $\delta_1+\delta_2$ between the end-tooth module 11 and the secondary part 3, the permanent magnet 12 of the end-tooth module 11 is correspondingly smaller, that is to say shorter. The end-tooth modules 11 have no tooth-wound coils. Apart from this, the tooth modules 4 and the end-tooth modules 11 are essentially physically identical.

With respect to the tooth modules 4, the end-tooth modules 11 have a different, preferably greater, tooth pitch $\tau_2$ than there is between the tooth modules 4. The first tooth pitch $\tau_1$ is the governing tooth pitch of the primary part 2, but the end-tooth modules 11 are at a different, preferably greater, distance $\tau_2$ from their respective adjacent tooth modules 4.

Figure 3:
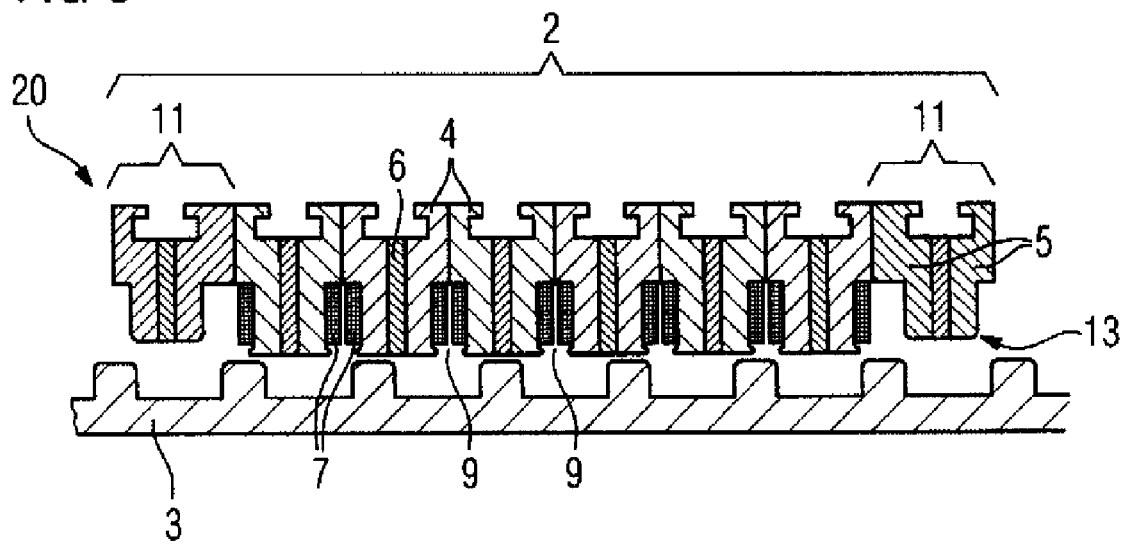
FIG. 3 is a schematic diagram of a second embodiment of a linear electrical machine according to the invention.

FIG. 3 shows a second embodiment of the invention, another linear electrical machine 20. The primary part 2 has the additional two end-tooth modules 11 in addition to the six tooth modules 4, wherein one end-tooth module 11 is arranged on each end face of the primary part 2.

The linear electrical machine 20 corresponds essentially to the embodiment shown in FIG. 2, but each end-tooth module 11 has a slightly modified geometry. In particular, the end-tooth modules 11 have rounded corners 13.

Figure 4:
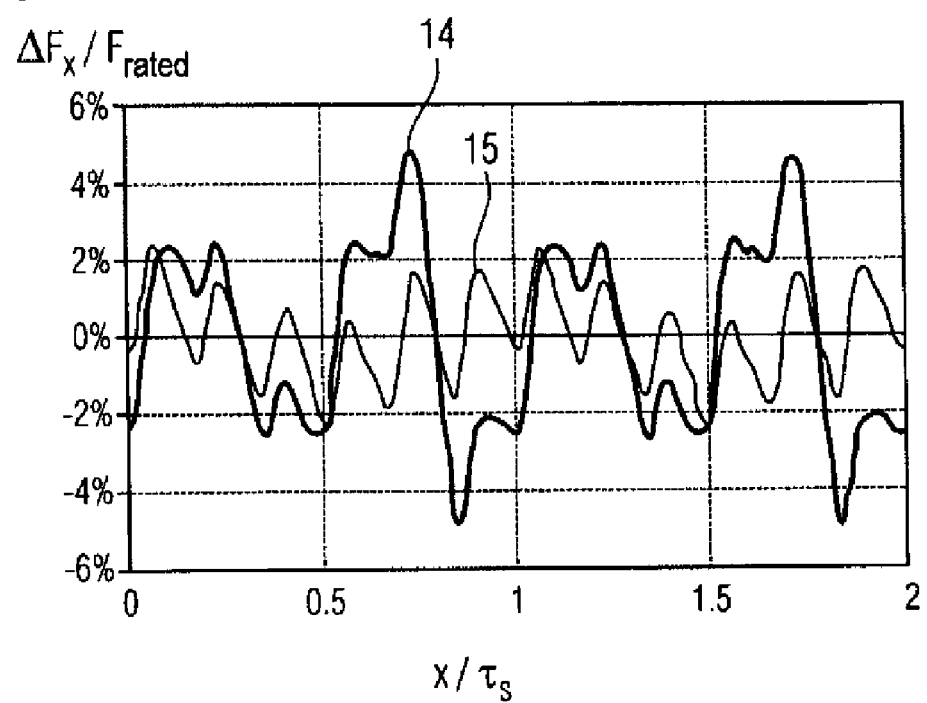
FIG. 4 is graph illustrating the cogging force profile of the linear electrical machines shown in FIG. 1 and FIG. 2.

FIG. 4 shows a graph that illustrates different cogging-force profile of two different electrical machines. The reference symbol 14 denotes the amplitude of the cogging force of the electrical machine 1 shown in FIG. 1, i.e., a machine without flux-guiding elements for reducing the force ripple. In contrast, reference numeral 15 denotes the amplitude of the cogging force of the electrical machine 10 shown in FIG. 2 that has end-tooth modules 11. FIG. 4 shows well that only minor cogging forces occur when elements are arranged to reduce the cogging force in accordance with the present invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A primary part of a linear electrical machine having a secondary part being spaced from the primary part by a first air gap, said primary part comprising:
   first means for producing a first magnetic field;
   second means for producing a second magnetic field, said second means being formed from permanent-magnet material, said first means and said second means being arranged so as to allow said first magnetic field and said second magnetic field to be superimposed; and
   a flux-guiding element arranged on at least one end face of the primary part and including an end-tooth module having at least one permanent magnet arranged so as to reduce force ripple.

2. The primary part of claim 1, wherein said first means is a single-phase winding.

3. The primary part of claim 1, wherein said first means is a polyphase winding.

4. The primary part of claim 1, further comprising a predefined number of tooth modules, wherein each tooth module has at least one permanent magnet and one tooth-wound coil.

5. The primary part of claim 4, wherein said tooth modules have a first tooth pitch with respect to one another and said flux-guiding element includes an end-tooth module having at least one permanent magnet arranged so as to reduce force ripple, said end-tooth module being separated from a tooth module by an additional predefined second tooth pitch, so that $\tau_1 \neq \tau_2$, wherein $\tau_1$ is the first tooth pitch, and $\tau_2$ is the second tooth pitch.

6. The primary part of claim 5, wherein $\tau_1 < \tau_2$.

7. The primary part of claim 4, wherein said end tooth module has a geometric shape that is different from the geometric shape of said tooth modules.

8. The primary part of claim 5, wherein $0.6\tau_1 \leq \tau_2 \leq 2\tau_1$.

9. The primary part of claim 1, wherein said end-tooth module is spaced from the secondary part by a second air gap in addition to the first air gap.

10. The primary part of claim 9, wherein $0 \leq \delta_2 \leq 5\delta_1$, wherein $\delta_1$ is the first air gap, and $\delta_2$ is the second air gap.

11. The primary part of claim 1, wherein the end-tooth module has a volume which is smaller than a volume of said tooth modules.

12. A linear electrical machine, comprising:
   a primary part having a single-phase or polyphase winding producing a first magnetic field and magnets formed from a permanent-magnet material producing a second magnetic field superimposed on the first magnetic field, and a flux-guiding element arranged on at least one end face of the primary part and including an end-tooth module having at least one permanent magnet arranged so as to reduce force ripple; and
   a secondary part spaced from said primary part by a first air gap, said secondary part lacking means to produce a magnetic field.

13. Thee primary part of claim 12, wherein said flux-guiding element is spaced from the secondary part by a second air gap in addition to the first air gap.

14. The primary part of claim 13, wherein a surface of said end-tooth module facing the first and second air gaps is rounded by a predefined radius.

15. The primary part of claim 13, wherein a corner of said end-tooth module facing the first and second air gaps is rounded by a predefined radius.

16. The linear electrical machine of claim 12, wherein said secondary part includes a toothed iron structure having a plurality of teeth and slots.

17. The linear electrical machine of claim 12, constructed in the form of a synchronous linear motor.

* * * * *